US006807253B2

United States Patent
Won (10) Patent No.: US 6,807,253 B2
(45) Date of Patent: Oct. 19, 2004

(54) SWITCHING APPARATUS HAVING FUNCTION FOR PROCESSING MALICIOUS CALL AND OPERATING METHOD OF THE SAME

(75) Inventor: Joung-Kyu Won, Euiwang-Shi (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 09/996,715

(22) Filed: Nov. 30, 2001

(65) Prior Publication Data

US 2002/0067809 A1 Jun. 6, 2002

(30) Foreign Application Priority Data

Dec. 4, 2000 (KR) ........................................ 2000-72834

(51) Int. Cl.[7] ........................... H04M 1/24; H04M 3/08; H04M 3/22
(52) U.S. Cl. ................................. 379/32.04; 379/207.1
(58) Field of Search ............................. 379/7, 32.4–35, 379/67.1, 68, 85, 88.19–88.23, 142.01, 142.04, 142.05, 142.06, 202.01–206.01, 207.01, 242, 245, 246

(56) References Cited

U.S. PATENT DOCUMENTS

| 4,712,230 | A | * | 12/1987 | Rice et al. ................... 379/111 |
| 5,351,287 | A | * | 9/1994 | Bhattacharyya et al. . 379/93.02 |
| 5,590,171 | A | * | 12/1996 | Howe et al. ................... 379/33 |
| 5,881,132 | A | * | 3/1999 | O'Brien et al. ............... 379/35 |
| 5,930,698 | A | * | 7/1999 | Bertacchi ..................... 455/405 |
| 6,026,147 | A | * | 2/2000 | Yeo ............................ 379/35 |
| 6,097,798 | A | * | 8/2000 | Albers et al. .......... 379/114.28 |
| 6,229,887 | B1 | * | 5/2001 | Albers et al. ................ 379/219 |
| 6,233,313 | B1 | * | 5/2001 | Farris et al. ........... 379/112.01 |
| 6,449,474 | B1 | * | 9/2002 | Mukherjee et al. ....... 455/414.2 |
| 6,470,075 | B1 | * | 10/2002 | Prieur ......................... 379/38 |
| 6,560,316 | B1 | * | 5/2003 | Gundlach .................... 379/35 |

* cited by examiner

Primary Examiner—Roland G. Foster
(74) Attorney, Agent, or Firm—Fleshner & Kim, LLP (57) ABSTRACT

A switching apparatus and method are disclosed. The method involves establishing, in response to a call from a caller, a communication path between the caller and a called party, selectively tracing only a CID of the caller, or the CID of the caller while wiretapping a content of the conversation, allocating a wiretap resource when a third communication path is established, and outputting the traced CID, information of the call, and wiretapped communication signals.

24 Claims, 5 Drawing Sheets

FIG. 1

(PRIOR ART)

SWITCHING APPARATUS HAVING FUNCTION FOR PROCESSING MALICIOUS CALL AND OPERATING METHOD OF THE SAME

BACKGROUND OF THE INVENTION

1. Field of the Invention

The present invention relates to a caller identification (ID) function in a cross switch, and more particularly to a switching apparatus having a function for processing a malicious call.

2. Description of the Related Art

In accordance with developments of communication techniques and manufacturing techniques for associated equipment, communication means have been made inexpensively available to many people. Currently, at least one communication means is available for each individual.

Recently, prank or malicious calls have been frequently made using the above mentioned communication means. In order to prevent such prank or malicious calls, various prank call discouraging devices have been proposed.

However, the proposed prank call discouraging devices only have an effect of temporarily preventing attempts to make a prank call because they are configured to simply generate a deafening sound or a strange sound offensive to the ear.

For this reason, the demand for techniques capable of permanently preventing prank calls has been greatly increased. To meet this demand, a CID technique has been proposed. Also, prank call interception techniques using the CID technique have been proposed.

Now, a procedure for processing a malicious call in a conventional cross switch will be described with reference to FIGS. 1 and 2.

Figure 1:
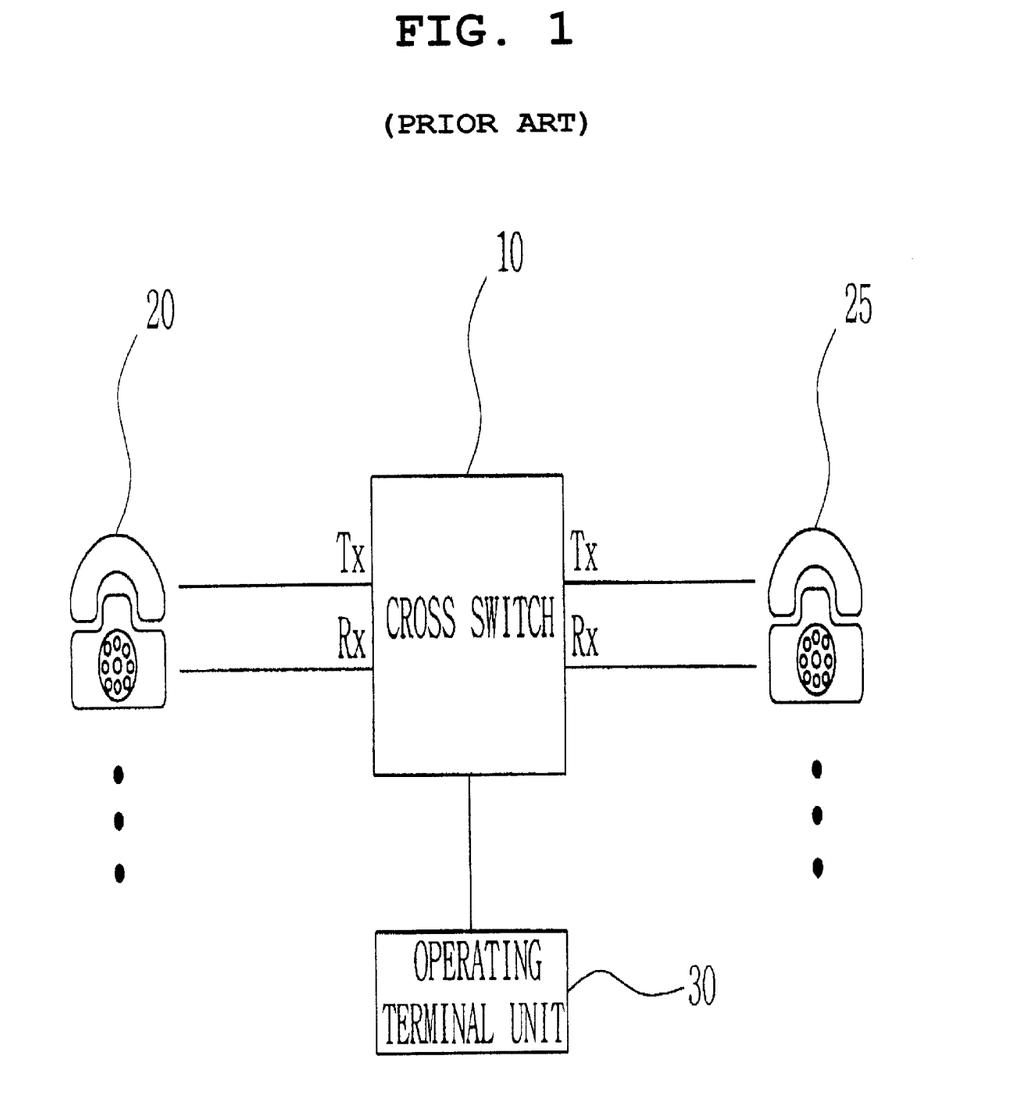
FIG. 1 is a diagram illustrating a connection configuration of a conventional cross switch.

FIG. 1 is a diagram illustrating a connection configuration of a conventional cross switch. FIG. 2 is a flow chart illustrating a procedure for processing a malicious call in the conventional cross switch.

Referring to FIG. 1, a cross switch 10 is illustrated which has a CID function, receives a plurality of subscribers, and establishes a communication path for each subscriber. A plurality of subscriber terminals are connected to the cross switch 10. Each of the subscriber terminals can communicate with a desired one of other subscriber terminals by calling the counterpart subscriber terminal. In FIG. 1, only two subscriber terminals 20 and 25 are shown. For the convenience and simplicity of description, the subscriber terminal 25 is referred to as a "calling subscriber terminal", whereas the subscriber terminal 20 is referred to as a "target or called subscriber terminal". To the cross switch 10, an operating terminal unit 30 is connected which monitors and controls the establishment of communication paths and the condition of communications through the established communication paths.

The procedure of processing a malicious call in the above mentioned connection configuration of the conventional cross switch will be described with reference to FIG. 2.

As mentioned above, a plurality of terminals are subscribed to the cross switch 10, which can trace or identify the CID of a caller in accordance with its CID function. When one subscriber terminal, that is, the calling subscriber terminal 25 calls a desired one of other subscriber terminals, that is, the target subscriber terminal 20, by dialing the telephone number of the target subscriber terminal 20, a dial signal from the calling subscriber terminal 25 is inputted to the cross switch 10 in accordance with the dialing operation.

In response to the dial signal, the cross switch 10 performs a switching operation to establish a communication path for connecting the calling subscriber terminal 25 and the target subscriber terminal 20. When the target subscriber terminal 20 receives an incoming call from the cross switch 10 via the established communication path, it generates a ring signal. In response to the ring signal, the user of the called subscriber terminal 20 hooks off the called subscriber terminal 20. Thus, the called subscriber terminal 20 can communicate with the calling subscriber terminal 25 via the established communication path. At this time, the malicious call processing procedure is begun, as shown in FIG. 2.

Figure 2:
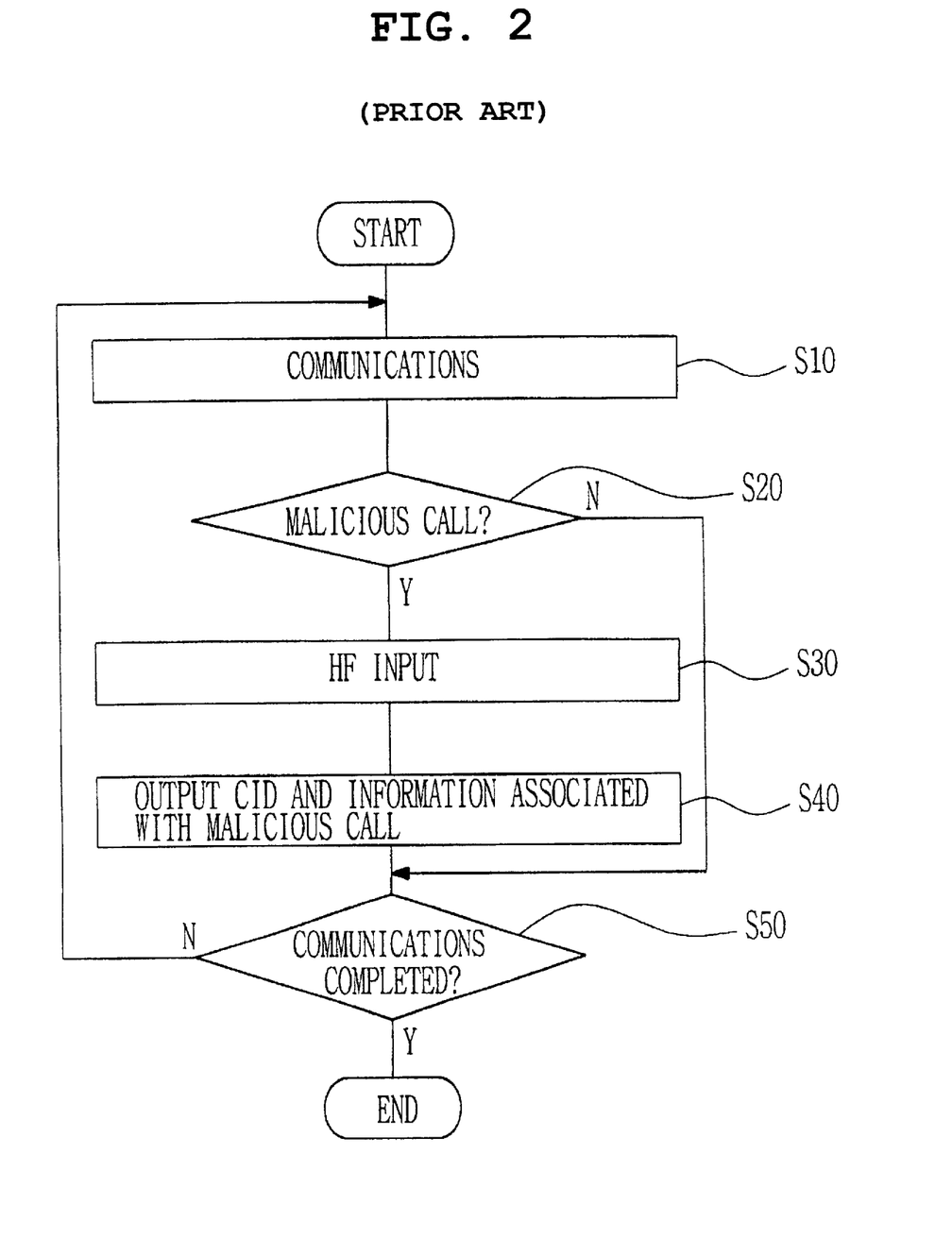
FIG. 2 is a flow chart illustrating a procedure for processing a malicious call in the conventional cross switch.

Referring to FIG. 2, the malicious call processing procedure involves:

a first step S10 of performing, by the called subscriber terminal 20, a communication with the calling subscriber terminal 25 in accordance with an off-hook of the called subscriber terminal 20 made in response to an incoming call received via an established communication path;

a second step S20 of, while in the process of communication, determining by the user of the called subscriber terminal 20 whether or not the call from the calling subscriber terminal 25 is a prank or malicious call;

a third step S30 of if it is determined at second step S20 that the call from the calling subscriber terminal 25 is a prank or malicious call, then generating a hook flash input in accordance with a manipulation of a hook flash button provided at the called subscriber terminal 20;

a fourth step S40 of identifying or tracing the CID of the calling subscriber terminal 25 by the cross switch 10, based on the hook flash input applied from the called subscriber terminal 20 to the cross switch 10; and a fifth step S50 of determining whether or not the communication has been completed, and returning to first step S10 when the communication is continued, while proceeding to an end step when the communication has been completed.

The above mentioned malicious call processing method will be described in more detail, with reference to FIGS. 1 and 2.

When the target subscriber terminal 20 subscribed to the cross switch 10 having a function for tracing the CID of a caller is called, and then communicated with the calling subscriber terminal 25 in accordance with an off-hook of its handset (Step S10), the user of the called subscriber terminal 20 determines whether or not the call from the calling subscriber terminal 25 is a prank or malicious call (Step S20).

When it is determined at second step S20 that the call from the calling subscriber terminal 25 is a prank or malicious call, the user manipulates the hook flash button provided at the called subscriber terminal 20, so as to generate a hook flash input (Step S30). The hook flash input from the called subscriber terminal 20 is sent to the cross switch 10 which, in turn, recognizes the hook flash input.

The cross switch 10 recognizes the hook flash input as a command for tracing the CID of the caller. In response to the hook flash input, the cross switch 10 collects the intrinsic number of the calling subscriber terminal 25 and information about the established communication path in association with the malicious call, and outputs the collected information, as malicious call information, to the operating terminal unit 30.

The operating terminal unit 30 stores the malicious call information, and identifies the stored CID of the caller or performs a desired process at the request of the user of the called subscriber terminal 20.

However, the above mentioned conventional technique has a problem in that it is impossible to trace and identify the CID of the malicious caller in a real time fashion.

Furthermore, there is a problem in that it is impossible to record or store the call speech of the malicious caller, or to allow a third party to directly hear the call speech of the malicious caller.

SUMMARY OF THE INVENTION

Therefore, an object of the invention is to provide a switching apparatus having a function for processing a malicious call, and an operating method of the switching apparatus, which are capable of outputting, via a designated path, the CID of a caller generating a malicious call, and allowing a third party to hear, record, or store the call speech of the malicious caller.

In accordance with one aspect, the present invention provides a switching apparatus for receiving a plurality of subscribers, and establishing a communication path between calling and called ones of the subscribers in accordance with a switching operation thereof, the switching apparatus having a function for processing a malicious call, comprising: a cross switch internally provided with a caller identification (CID) processor adapted to identify a CID, the cross switch being connected with a plurality of subscriber terminals respectively associated with the subscribers while serving to establish a communication path between calling and called ones of the subscriber terminals in accordance with a switching operation thereof; a wiretap resource unit for establishing a communication path enabling a plurality of designated subscribers to communicate simultaneously, in response to a conference call; the subscriber terminals each connected to the cross switch while having a function to call a desired one of the remaining subscriber terminals, thereby communicating with the called subscriber terminal; an operating terminal unit connected between the cross switch and the wiretap resource unit, the operating terminal unit serving to set the communication path between the calling subscriber terminal and the called subscriber terminal to pass through a selected one of the cross switch and the wiretap resource unit, while serving to monitor and control the entire part of the switching apparatus; a database for storing data on a third communication path allocated and designated for wiretapping of a content of conversation by telephone made in association with a malicious call; and a wiretap terminal connected to the wiretap resource unit and adapted to wiretap and record the content of conversation by telephone made in association with the malicious call.

In accordance with another aspect, the present invention provides a method for processing a malicious call in a switching apparatus having caller identification (CID) and conference call functions, comprising: a communicating step of establishing, in response to a call from a calling subscriber terminal, a communication path between the calling subscriber terminal and a called subscriber terminal, and enabling a communication between the calling and called subscriber terminals via the established communication path; a call processing mode determining step of determining whether a call processing mode set by the called subscriber terminal corresponds to a mode for tracing only a CID of the calling subscriber terminal, or a mode for tracing a CID of a particularly designated caller or CIDs of all callers while wiretapping a content of conversation by telephone made by the particularly designated caller or each of the callers; a resource allocating step of if it is determined that the set call processing mode corresponds to the mode for tracing the CID or CIDs while wiretapping the content of conversation by telephone, then determining whether or not at least one third communication path for wiretap services is established, and allocating a wiretap resource when it is determined that the third communication path is established; a wiretapping step of outputting the CID of the calling subscriber terminal, information about the call generated by the calling subscriber terminal, and a communication signal for wiretap on the third communication path; and communication completion determining and resource releasing steps of determining whether or not communications between the calling and called subscriber terminals have been completed, and returning to the call processing mode determining step when the communications are continued, while releasing the allocated wiretap resource when the communications have been completed, and returning to a process completing step.

BRIEF DESCRIPTION OF THE DRAWINGS

The above and other objects, features and other advantages of the present invention will be more clearly understood from the following detailed description taken in conjunction with the drawings, in which.

DESCRIPTION OF THE PREFERRED EMBODIMENTS

Now, a method for processing a malicious call in a cross switch in accordance with the present invention will be described with reference to the annexed drawings.

Figure 3A:
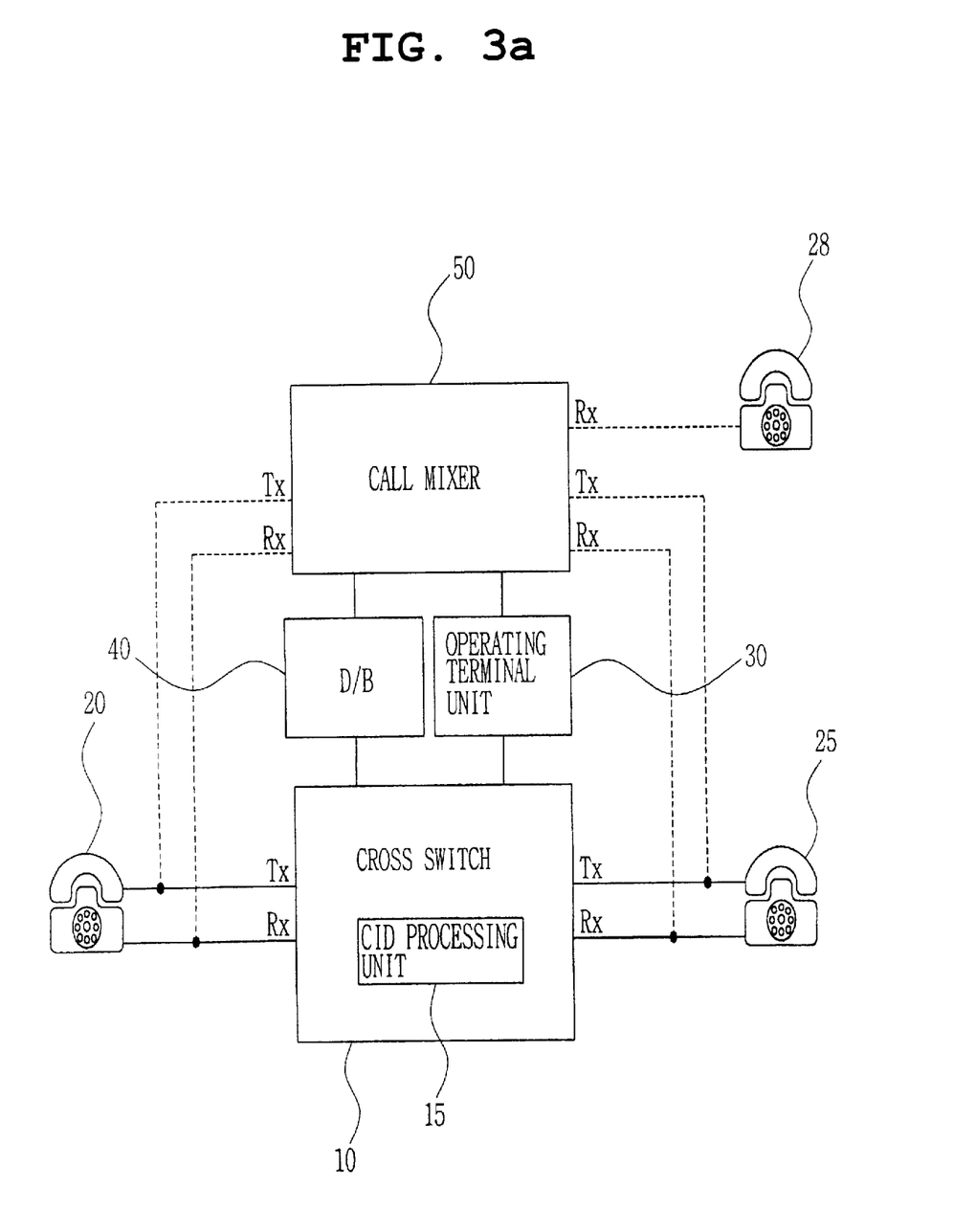
FIG. 3a is a block diagram of a switching apparatus according to the present invention, illustrating a functional configuration of the switching apparatus in a normal operating state.
Figure 3B:
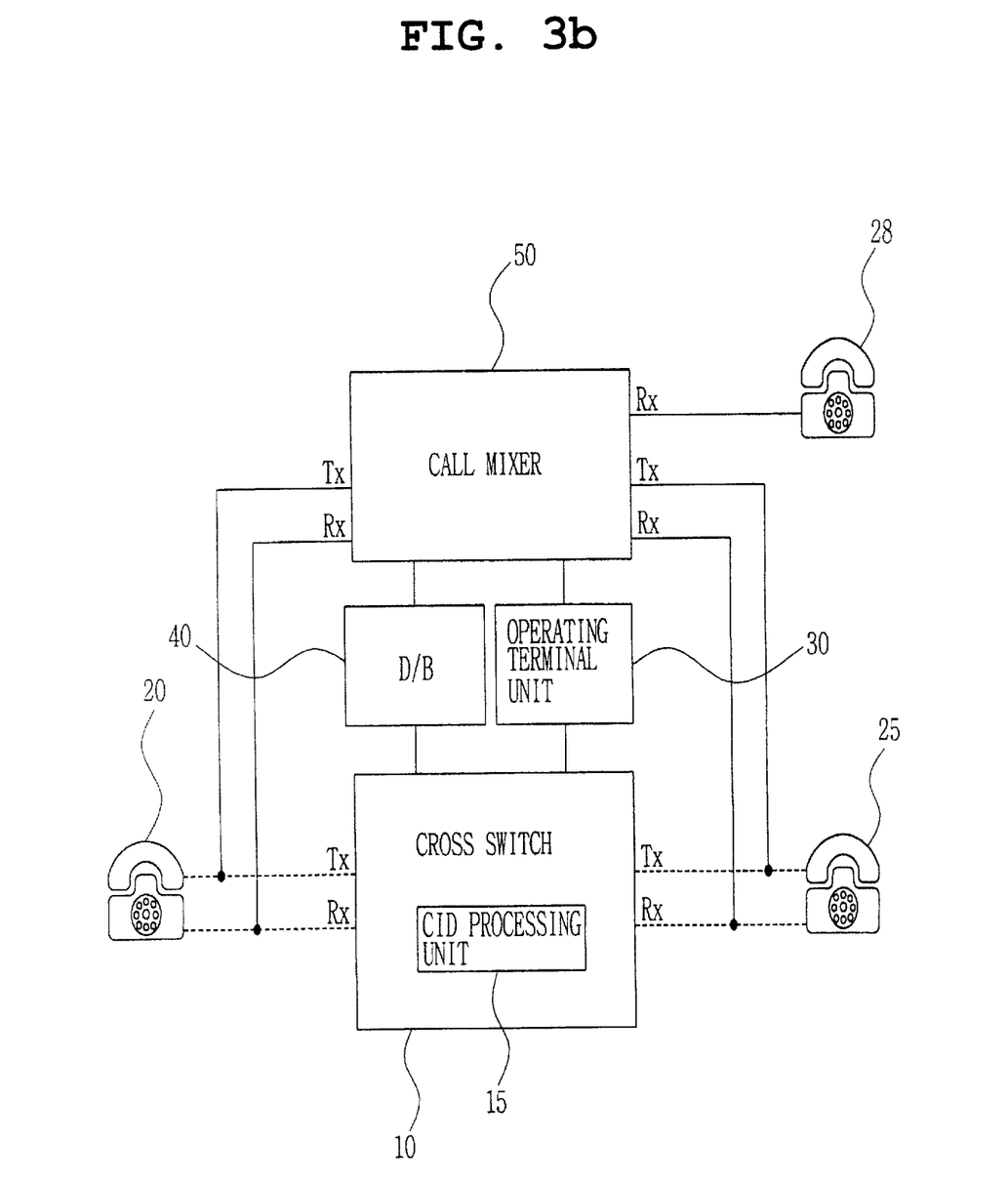
FIG. 3b is a block diagram of the switching apparatus according to the present invention, illustrating a functional configuration of the switching apparatus in a wiretap operating state.
Figure 4:
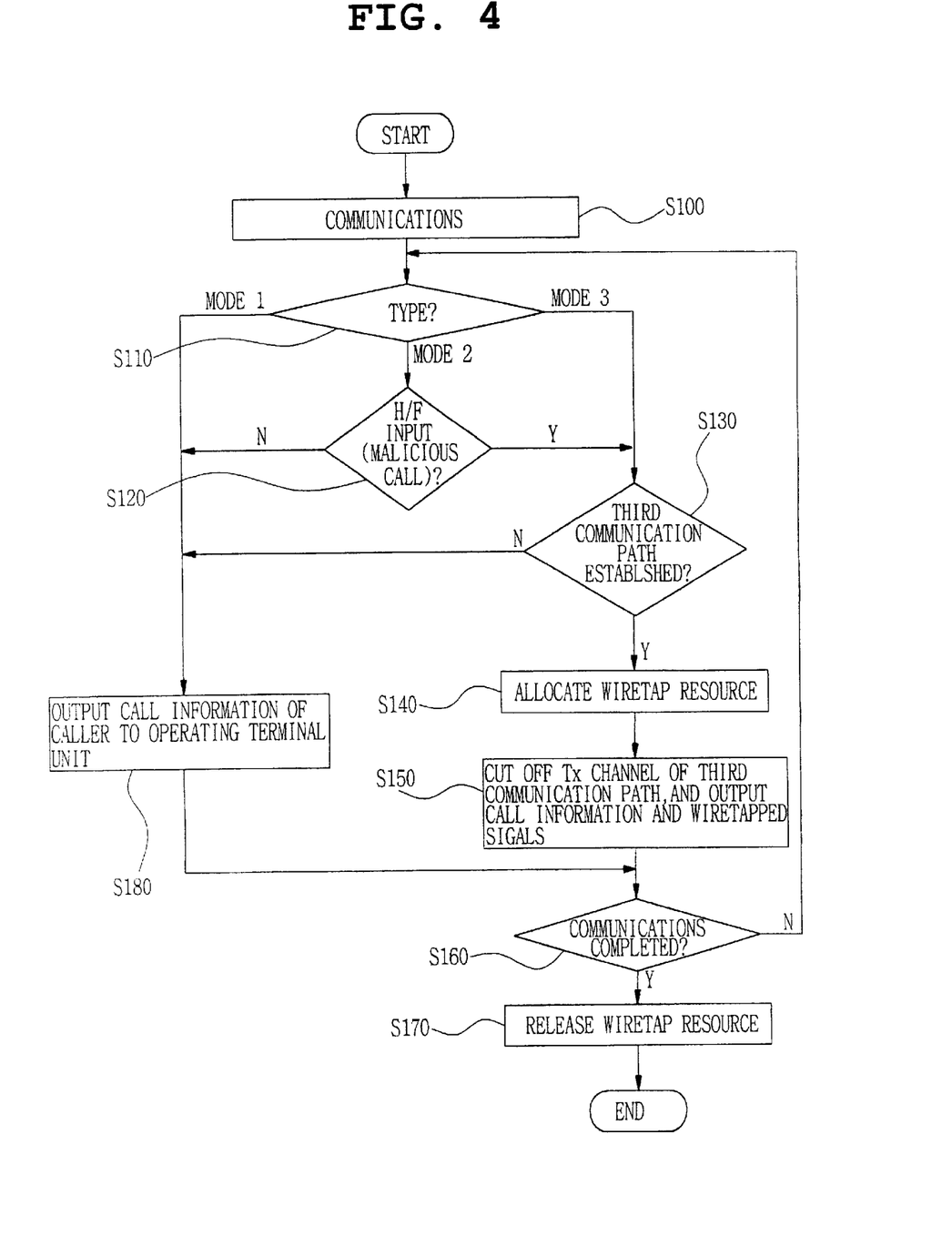
FIG. 4 is a flow chart illustrating a method for processing a malicious call in the switching apparatus in accordance with the present invention.

FIG. 3a is a block diagram of a switching apparatus according to the present invention, illustrating a functional configuration of the switching apparatus in a normal operating state. FIG. 3b is a block diagram of the switching apparatus according to the present invention, illustrating a functional configuration of the switching apparatus in a wiretap operating state. FIG. 4 is a flow chart illustrating a method for processing a malicious call in the switching apparatus in accordance with the present invention. In FIGS. 3a and 3b, elements respectively corresponding to those in FIG. 1 are denoted by the same reference numerals.

As shown in FIGS. 3a and 3b, the switching apparatus of the present invention, which has a function for processing a malicious call, includes a cross switch 10 internally provided with a CID processor 15. The cross switch 10 is connected with a plurality of subscriber terminals, and adapted to establish a communication path between calling and called subscriber terminals in accordance with a switching operation thereof. The switching apparatus also includes a call mixer or wiretap resource unit 50 for establishing communication paths enabling a plurality of designated subscribers to communicate simultaneously, in response to a conference call. Each subscriber terminal, which is connected to the cross switch 10, can communicate with a desired one of other subscriber terminals by calling the counterpart subscriber terminal. In FIGS. 3*a* and 3*b*, only two subscriber terminals 20 and 25 are shown. For the convenience and simplicity of description, the subscriber terminal 25 is referred to as a "calling subscriber terminal", whereas the subscriber terminal 20 is referred to as a "target or called subscriber terminal". An operating terminal unit 30 is connected between the cross switch 10 and the call mixer or wiretap resource unit 50. The operating terminal unit 30 serves to set the communication path between the calling subscriber terminal 25 and the called subscriber terminal 20 to pass through a selected one of the cross switch 10 and the call mixer or wiretap resource unit 50. The operating terminal unit 30 also functions to monitor and control the entire part of the switching apparatus. The switching apparatus further includes a database 40 for storing data on a third communication path allocated and designated for wiretapping of the content of conversation by telephone made in association with a malicious call, and a wiretap terminal 28 connected to the call mixer or wiretap resource unit 50 only via a receiving channel under the control of the operating terminal unit 30 and adapted to wiretap and record the content of conversation by telephone made in association with the malicious call under the condition in which the caller cannot recognize the wiretap.

Referring to FIG. 4, a method for operating the above described switching apparatus having CID and conference call functions to process a malicious call in accordance with the present invention is illustrated. As shown in FIG. 4, the operating method involves:

a communicating step S100 of performing a switching operation by the cross switch 10 to establish a communication path between the caller or calling subscriber terminal 25 and the called party or called subscriber terminal 20 in response to a call from the caller, thereby allowing the calling subscriber terminal 25 and the called subscriber terminal 20 to communicate with each other via the established communication path;

a call processing mode determining step S110 of determining, by the operating terminal unit 30, whether the call processing mode set by the user of the called subscriber terminal 20 or the called party corresponds to a first mode for tracing only the CID of the calling subscriber terminal 25, a second mode for tracing the CID of a particularly designated caller while wiretapping the content of conversation by telephone made by the particularly designated caller, or a third mode for tracing the CIDs of all callers while wiretapping the content of conversation by telephone made by each of the callers;

resource allocating steps S130 and 5140 of if it is determined at the call processing mode determining step S110 that the set call processing mode corresponds to the second mode, then determining whether or not a third communication path designated for wiretap services is established by the wiretap resource unit 50, and allocating a desired wiretap resource to the calling subscriber terminal 25 and the called subscriber terminal 20 by the wiretap resource unit 50 under the control of the operating terminal unit 30 when it is determined that the third communication path is established, thereby connecting the terminals 20 and 25 to the third communication path;

a wiretapping step S150 of outputting the CID of the calling subscriber terminal 25, the information about the call generated by the calling subscriber terminal 25, and a communication signal for wiretap services on the third communication path; and communication completion determining and resource releasing steps S160 and S170 of determining whether or not the communication between the called subscriber terminal 20 and the calling subscriber terminal 25 has been completed, and returning to the call processing mode determining step S110 when the communication is continued, while releasing the allocated wiretap resource when the communication has been completed, and returning to a process completing step.

Now, the method for processing a malicious call in the switching apparatus in accordance with the present invention will be described in detail, with reference to FIGS. 3 and 4.

The called subscriber terminal 20 and the calling subscriber terminal 25 are connected to the cross switch 10 and wiretap resource unit 50 of the switching apparatus. As described above, the cross switch 10 has a CID function, and a conference call function enabling at least three users to communicate simultaneously. All functions of the switching apparatus are monitored and controlled by the operating terminal unit 30.

When the subscriber terminal 20 is called by a malicious call from the calling subscriber terminal 25, tracing of the CID of the calling subscriber terminal 25 or wiretapping of the content of conversation by telephone to record or store the content is performed in accordance with a call processing mode previously set by the user of the called subscriber terminal 20.

For the call processing mode previously set by the user of the called subscriber terminal 20, there are three modes, that is, a first mode, a second mode, and a third mode, which are stored at areas respectively designated in the database 40 of the switching apparatus.

Accordingly, the tracing of the CID of the calling subscriber terminal 25 is performed alone or along with the wiretapping of the content of conversation by telephone in accordance with a mode selected from the above mentioned call processing modes.

When the calling subscriber terminal 25 connected to the cross switch 10 and wiretap resource unit 50 of the switching apparatus dials the telephone number of the target subscriber terminal 20, a communication path is established in accordance with a switching operation of the switching apparatus 10. Accordingly, the calling subscriber terminal 25 and the called subscriber terminal 20 are connected to each other via the established communication path so that they can communicate with each other (Step S100).

The operating terminal unit 30 of the switching apparatus determines whether the call processing mode set by the user of the called subscriber terminal 20 or the called party corresponds to the first mode for tracing only the CID of the calling subscriber terminal 25, the second mode for tracing the CID of a particularly designated caller while wiretapping the content of conversation by telephone made by the particularly designated caller, or the third mode for tracing the CIDs of all callers while wiretapping the content of conversation by telephone made by each of the callers (Step S110).

Where it is determined at step S110 that the set call processing mode corresponds to the first mode, the operating terminal unit 30 applies an associated control signal to the CID processor 15 of the cross switch 10. In response to the control signal, the CID processor 15 outputs the CID and call information of the caller to the operating terminal unit 30 (Step S180). The operating terminal unit 30 stores the CID and call information at a desired area of the database 40 in order to allow the called subscriber terminal 20 to subsequently identify the stored CID.

Where it is determined at step S110 that the set call processing mode corresponds to the second mode, the operating terminal unit 30 applies an associated control signal to the cross switch 10. In response to the control signal, the cross switch 10 recognizes the second mode, and then determines whether or not a hook flash input or a wiretap input is generated from the called subscriber terminal 20 (Step S120). Where it is determined at step S120 that neither the hook flash input nor the wiretap input is generated, the procedure proceeds to the CID identifying step S180.

Where it is determined at step S110 that the set call processing mode corresponds to the third mode, or it is determined at step S120 that the hook flash input or the wiretap input is generated, the operating terminal unit 30 applies an associated control signal to the cross switch 10. In response to the control signal, the cross switch 10 recognizes the third mode, and searches the database 40 for information about a third communication path for wiretap services.

The searched information about the third communication path is sent to the wiretap resource unit 50 so as to allow the wiretap resource unit 50 to establish the third communication path, to which a third party or a wiretap terminal 28 is connected. Subsequently, the operating terminal unit 30 determines whether or not the third communication path is established (Step S130).

When it is determined at step S130 that the third communication path is not established by the wiretap resource unit 50, the procedure proceeds to the CID identifying step S180 in order to allow the operating terminal unit 30 to only record the CID of the calling subscriber terminal 25.

On the other hand, where it is determined at step S130 that the third communication path is established, the operating terminal unit 30 controls the wiretap resource unit 50 to allocate a desired wiretap resource to the calling subscriber terminal 25 and the called subscriber terminal 20, thereby allowing the terminals 20 and 25 to be connected to the third communication path (Step S140).

Thereafter, the operating terminal unit 30 controls the wiretap resource unit 50 to allow the calling subscriber terminal 25, the called subscriber terminal 20, and the wiretap terminal 28 to be connected together for simultaneous call services or conference call services while cutting off the transmitting channel Tx of the third communication path, thereby allowing the wiretap terminal 28 to only have a reception function (Step S150). Accordingly, the user of the wiretap terminal 28 can wiretap the content of conversation by telephone between the user of the calling subscriber terminal 25 and the user of the called subscriber terminal 20.

At step S150, the CID processor 15 also outputs the CID and call information of the caller to the operating terminal unit 30 which, in turn, stores the CID and call information at a desired area of the database 40 in order to allow the called subscriber terminal 20 to subsequently identify the stored CID. At step S150, the wiretap resource unit 50 also outputs a wiretap signal to the operating terminal unit 30.

Subsequently, the operating terminal unit 30 determines whether or not the communication between the calling subscriber terminal 25 and the called subscriber terminal 20 has been completed (Step S160). Where the communication is continued, the procedure returns to the call processing mode determining step S110. On the other hand, when the communication has been completed, the wiretap resource unit 50 allocated to enable conference call services among the calling subscriber terminal 25, called subscriber terminal 20, and wiretap terminal 28, is released.

The wiretap resource unit 50 is a call mixer for enabling the communication lines or paths of a plurality of subscribers subscribed to the switching apparatus to be simultaneously connected together, thereby allowing those subscribers to receive conference call services. The call mixer performs the above mentioned switching operation under the control of the operating terminal unit 30.

As described above, the information about the third communication path designated by the operating terminal unit 30 is stored in the database 40. The designation of the third communication path is achieved by the operator of the operating terminal unit 30 or using a feature code used by the called subscriber terminal 20. One third communication path or a plurality of third communication paths may be allocated, and designated. The information about such a designated third communication path is stored at a desired area in the database 40.

The stored third communication path information may be optionally modified by the called subscriber terminal 20 or operating terminal unit 30. For the third communication path information, called number identifications previously stored, fixed, and stored in the database may be used.

The wiretap terminal 28 connected to the third communication path may be a terminal placed at a police station. A recording device may be connected to the wiretap terminal 28. For the wiretap terminal 28, any kind of wired or wireless terminals may be used.

FIG. 3a illustrates the procedure for establishing a communication path between the calling subscriber terminal 25 and the called subscriber terminal 20 by the cross switch 10 in a normal call processing mode or in the first call processing mode. FIG. 3b illustrates the procedure for connecting the calling subscriber terminal 25, the called subscriber terminal 20, and the wiretap terminal 28 of the third communication path by the call mixer or wiretap resource unit 50 having a switching function for conference call services.

When the calling subscriber terminal 25, the called subscriber terminal 20, and the wiretap terminal 28 of the third communication path are connected together by the wiretap resource unit 50, conference call services are enabled.

In this case, the wiretap resource unit 50 cuts off the transmitting channel Tx of the wiretap terminal 28 while maintaining only the receiving channel Rx of the wiretap terminal 28. Accordingly, the content of conversation by telephone between the calling subscriber terminal 25 and the called subscriber terminal 20 is outputted to the third communication path so that it is wiretapped or recorded under the condition in which the caller cannot recognize the wiretap.

Thus, the called subscriber terminal 20 receiving a malicious call from the caller subscriber terminal 25, and the wiretap terminal 28 of the third communication path are in a conference call service state, so that the content of conversation by telephone between the calling subscriber terminal 25 and the called subscriber terminal 20 in association with the malicious call is completely wiretapped by the call mixer or wiretap resource unit 50 in the conference call service state.

In this state, the calling subscriber terminal 25 and the called subscriber terminal 20 can perform bidirectional communications, that is, transmission and reception, with each other, whereas the wiretap terminal 28 is connected to the third communication path only on its receiving channel, and the transmitting channel of the wiretap terminal 28 is cut off.

Accordingly, noise signals, which may be generated during the wiretapping operation, cannot output to the calling subscriber terminal 25 and the called subscriber terminal 20. In particular, the calling subscriber terminal 25, which has generated the malicious call, cannot recognize the wiretap.

After the above mentioned operation, the operating terminal unit 30 determines whether or not the communication between the calling subscriber terminal 25 and the called subscriber terminal 20 has been completed. Where the communication is continued, the procedure returns to the call processing mode determining step S110 so as to continuously perform the tracing of the malicious call. On the other hand, where the communication has been completed, the wiretap resource unit 50 allocated at the resource allocating step S140 is released (Step S170). Following step S170, the procedure proceeds to the processing completing step.

The cross switch 10 has a time-space-time (T-S-T) switching configuration or a time-time (T-T) configuration. The cross switch 10 is connected to the call mixer 50 so as to have a call mixer function. The communication of the cross switch 10 is carried out on transmitting and receiving channels Tx and Rx. Accordingly, transmitting signals are transmitted on the transmitting channel Tx, whereas receiving signals are transmitted on the receiving channel Rx.

Where the calling subscriber terminal 25 generates a malicious call, the called subscriber terminal 20, which receives the malicious call, can identify the call in accordance with three call processing modes.

The first mode is to identify only the CID of the calling subscriber terminal 25, based on the call from the calling subscriber terminal 25. The second mode is to identify the information about a call generated by a particularly designated caller, and the CID of the caller while wiretapping the content of conversation by telephone made by the caller. The third mode is to identify the CIDs of all callers, and the information about the call generated by each of the callers while wiretapping the content of conversation by telephone made by each of the callers.

The designation of a desired call processing mode is achieved by inputting the following designation code or feature code by the called subscriber terminal 20 or operating terminal unit 30.

Mode 3: *77#3#xxxxxxx SEND;

Mode 2: *77#2#xxxxxxx SEND;

Mode 1: *77#1# SEND; and

Normal Mode: *78 SEND where, "xxxxxxx" represents the telephone number of the called party to be wiretapped/monitored on the third communication path;

"*77" represents a feature code for registering an additional service for tracing a malicious call; and "*78" represents a feature code for releasing the registered malicious call tracing service.

The designation code or feature code may be inputted in accordance with a command inputted by the operator of the operating terminal unit 30. The inputting of the designation code or feature code may also be achieved by the called subscriber terminal 20. In accordance with the designation code or feature code, it is possible to identify the CID and call information of the calling subscriber terminal 25, and to wiretap the content of conversation by telephone made by the calling subscriber terminal 25.

The wiretapper connected to the third communication path may be an investigation agency or a police office. A plurality of wiretappers may be connected to the switching apparatus in accordance with the capacity of the call mixer, that is, the wiretap resource unit 50. The wiretapped conversation content may be recorded.

The wiretapper is connected to the third communication path via its receiving channel Rx, whereas its transmitting channel Tx is cut off. Accordingly, no forward signal such as a ring back tone or call forwarding tone can be applied.

Where the wiretapper is connected to the third communication path, the operating terminal unit 30 allows automatic recording of wiretapped signals and CID, and outputs the wiretapped information to a monitor so as to display the information.

As apparent from the above description, the present invention provides a switching apparatus and an operating method thereof which can process a malicious call in a selected one of three call processing modes to identify the CID of a caller generating the malicious call while wiretapping and recording the content of conversation by telephone made by the caller. Accordingly, the present invention can trace malicious calls, thereby discouraging malicious calls. In accordance with additional services provided by the switching apparatus of the present invention, it is possible to achieve an enhancement in system operating efficiency and reliability.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A switching apparatus for receiving a plurality of subscribers, and establishing a communication path between calling and called ones of the subscribers in accordance with a switching operation thereof, comprising:

a cross switch internally provided with a caller identification (CID) processor adapted to identify a CID, the cross switch being connected with a plurality of subscriber terminals respectively associated with the subscribers while serving to establish a communication path between calling and called ones of the subscriber terminals in accordance with a switching operation thereof, a wiretap resource unit for establishing a communication path enabling a plurality of designated subscribers to communicate simultaneously;

the subscriber terminals each connected to the cross switch, thereby communicating with the called subscriber terminal;

an operating terminal unit connected between the cross switch and the wiretap resource unit, the operating terminal unit serving to set the communication path between the calling subscriber terminal and the called subscriber terminal to pass through a selected one of the cross switch and the wiretap resource unit, while serving to monitor and control the entire part of the switching apparatus that was used to pass through the selected one of the cross switch and the wiretap unit;

a database for storing data on a third communication path allocated and designated for wiretapping of a content on conversation by telephone made in association with a malicious call; and a wiretap terminal connected to the wiretap resource unit and adapted to wiretap and record the content of conversation by telephone made in association with the malicious call.

2. The switching apparatus according to claim 1, wherein the operating terminal unit serves to control a resource of the wiretap resource unit allocated to the wiretap terminal so that the wiretap terminal is connected to the third communication path only via a receiving channel.

3. A method for processing a malicious call in a switching apparatus having caller identification (CID) and conference call functions, comprising:

determining a call processing mode set by a called subscriber terminal to trace only a CID of a calling subscriber terminal, or to trace a CID of a particularly designated caller or CIDs of all callers while wiretapping a content of conversation by telephone made by the particularly designated caller or each of the callers;

if it is determined that the call processing mode is set to trace the CID or CIDs while wiretapping the content of conversation by telephone, then establishing a third communication path for wiretap services, and allocating a wiretap resource to allow the content of conversation by telephone to be wiretapped via the third communication path; and outputting the wiretapped content of conversation by telephone via the third communication path, releasing the allocated wiretap resource when communications between the called and calling subscriber terminals are completed, and completing the processing of the malicious call.

4. The method according to claim 3, wherein the call processing mode is set to one of a first mode for tracing only the CID of the calling subscriber terminal, a second mode for tracing the CID of the particularly designated caller while wiretapping the content of conversation by telephone made by the particularly designated caller, and a third mode for tracing the CIDs of all callers while wiretapping the content of conversation by telephone made by each of the callers.

5. The method according to claim 4, further comprising:

if it is determined that the set call processing mode corresponds to the first mode, then outputting, to an operating terminal unit, the CID of the calling subscriber terminal, and information about a call generated by the calling subscriber terminal, thereby allowing the operating terminal unit to store the CID and the call information.

6. The method according to claim 4, further comprising:

if it is determined that the set call processing mode corresponds to the second mode, then determining whether or not a wiretap enabling signal is inputted, and processing a call processing operation associated with the third mode when it is determined that no wiretap enabling signal is inputted, while processing a call processing operation associated with the first mode when it is determined that the wiretap enabling signal is inputted.

7. The method according to claim 4, further comprising:

if it is determined that the set call processing mode corresponds to the third mode, then determining whether or not the third communication path is established;

if it is determined that the third communication path is not established, then performing a call processing operation associated with the first mode; and if it is determined that the third communication path is established, then wiretapping the content of conversation by telephone via the allocated wiretap resource, and releasing the allocated wiretap resource when the communications between the called and calling subscriber terminals are completed.

8. A method for processing a malicious call in a switching apparatus having caller identification (CID) and conference call functions, comprising:

a communicating step of establishing, in response to a call from a calling subscriber terminal, a communication path between the calling subscriber terminal and a called subscriber terminal, and enabling a communication between the calling and called subscriber terminals via the established communication path;

a call processing mode determining step of determining whether a call processing mode set by the called subscriber terminal corresponds to a mode for tracing only a CID of the calling subscriber terminal, or a mode for tracing a CID of a particularly designated caller or CIDs of all callers while wiretapping a content of conversation by telephone made by the particularly designated caller or each of the callers;

a resource allocating step of if it is determined that the set call processing mode corresponds to the mode for tracing the CID or CIDs while wiretapping the content of conversation by telephone, then determining whether or not at least one third communication path for wiretap services is established, and allocating a wiretap resource when it is determined that the third communication path is established;

a wiretapping step of outputting the CID of the calling subscriber terminal, information about the call generated by the calling subscriber terminal, and a communication signal for wiretap on the third communication path; and communication completion determining and resource releasing steps of determining whether or not communications between the calling and called subscriber terminals have been completed, and returning to the call processing mode determining step when the communications are continued, while releasing the allocated wiretap resource when the communications have been completed, and returning to a process completing step.

9. The method according to claim 8, wherein the call processing mode determining is carried out by determining, by the switching apparatus, whether the call processing mode set by the called subscriber terminal corresponds to a first mode for tracing only a CID of the calling subscriber terminal, a second mode for tracing a CID of a particularly designated caller while wiretapping a content of conversation by telephone made by the particularly designated caller, or a third mode for tracing CIDs of all callers while wiretapping a content of conversation by telephone made by each of the callers.

10. The method according to claim 9, further comprising:

if it is determined that the set call processing mode corresponds to the first mode, then outputting, to an operating terminal unit, the CID of the calling subscriber terminal, and information about a call generated by the calling subscriber terminal, thereby allowing the operating terminal unit to store the CID and the call information.

11. The method according to claim 9, further comprising:

if it is determined that the set call processing mode corresponds to the second mode, then determining whether or not a wiretap enabling signal is inputted;

if it is determined that the wiretap enabling signal is inputted, then proceeding to the resource allocating step; and if it is determined that no wiretap enabling signal is inputted, then proceeding to the CID tracing step.

12. The method according to claim 8, wherein the resource allocating step comprises:

determining whether or not the third communication path is established;

if it is determined that the third communication path is not established, then proceeding to the CID tracing step; and if it is determined that the third communication path is established, then allocating a wiretap resource to wiretap the content of conversation by telephone.

13. The method according to claim 8, wherein the wiretap resource is a switching resource for conference call services adapted to interconnect a plurality of terminals subscribed to the switching apparatus.

14. The method according to claim 8, wherein the resource allocating step is carried out to allocate a wiretap resource to a plurality of third communication paths so that a plurality of wiretappers carry out a wiretap at different places, respectively.

15. The method according to claim 8, wherein a wired or wireless terminal is connected to the third communication path.

16. The method according to claim 8, wherein the resource allocating step is carried out by allocating the wiretap resource using data about the third communication path stored in a database.

17. The method according to claim 8, wherein the third communication path is established, based on a code designated by the called subscriber terminal, or by an operating terminal unit.

18. The method according to claim 8, wherein the wiretapping step is carried out by cutting off a transmitting channel of the third communication path while connecting only a receiving channel of the third communication path.

19. The method according to claim 8, wherein the allocation of the wiretap resource is carried out by allocating a line for conference call services.

20. The method according to claim 8, wherein the wiretapping step is carried out by recording communication signals from the calling subscriber terminal.

21. The switching apparatus according to claim 1, wherein the wiretap resource connects a plurality of third communication paths so that a plurality of wire tap terminals catty out a wiretap at different places, respectively.

22. The switching apparatus according to claim 1, wherein the wire tap terminal is at least one of a wired and a wireless terminal.

23. The switching apparatus according to claim 1, wherein the third communication path is established, based on a code designated by the called subscriber terminal.

24. The switching apparatus according to claim 1, wherein a transmitting channel of the third communication path is cut off while connecting only a receiving channel of the third communication path.

* * * * *